United States Patent
Yang et al.

(10) Patent No.: US 7,410,252 B2
(45) Date of Patent: Aug. 12, 2008

(54) SPECTACLE FRAMES

(76) Inventors: Wah Kiang Yang, 82 Genting Lane, #06-05, Singapore 349567 (SG); Andong Zhang, Unit 20C, 16-20 Hereward Street, Maroubra, New South Wales 2035 (AU)

( * ) Notice: Subject to any disclaimer, the term of this patent is extended or adjusted under 35 U.S.C. 154(b) by 0 days.

(21) Appl. No.: 10/589,918

(22) PCT Filed: Feb. 18, 2005

(86) PCT No.: PCT/SG2005/000048

§ 371 (c)(1),
(2), (4) Date: Aug. 18, 2006

(87) PCT Pub. No.: WO2005/081044

PCT Pub. Date: Sep. 1, 2005

(65) Prior Publication Data

US 2007/0171356 A1  Jul. 26, 2007

(30) Foreign Application Priority Data

Feb. 19, 2004 (SG) .............................. 200400777-9
Sep. 15, 2004 (SG) .............................. 200405760-0

(51) Int. Cl.
G02C 1/08 (2006.01)
G02C 5/16 (2006.01)

(52) U.S. Cl. ............................ 351/90; 351/97; 351/101; 351/114

(58) Field of Classification Search ........... 351/90–102, 351/111, 113, 114, 140–143, 149–152, 153; 16/228
See application file for complete search history.

(56) References Cited

U.S. PATENT DOCUMENTS

| | | | | |
|---|---|---|---|---|
| 3,744,887 A | * | 7/1973 | Dunbar | 351/153 |
| 3,813,152 A | * | 5/1974 | Hampel | 351/153 |
| 4,978,209 A | * | 12/1990 | Ohba | 351/153 |
| 4,995,713 A | * | 2/1991 | Curto et al. | 351/113 |
| 6,802,604 B2 | * | 10/2004 | McCormick | 351/112 |
| 6,890,073 B2 | * | 5/2005 | DiChiara et al. | 351/90 |

* cited by examiner

*Primary Examiner*—Huy K Mai
(74) *Attorney, Agent, or Firm*—Rosenberg, Klein & Lee

(57) ABSTRACT

There is provided a spectacle frame comprising: a front for holding therein two lenses; the front having front end pieces extending rearward at each end thereof, each front end piece having an upper portion and a lower portion; and one of the upper portion and the lower portion having a geometric projection for engagement in and disengagement from a corresponding sized and shaped geometric opening in the other of the upper portion and the lower portion, the engagement and disengagement being by lateral movement only. A clip for engagement with front end pieces of a spectacle frame is also disclosed.

27 Claims, 12 Drawing Sheets

SPECTACLE FRAMES

FIELD OF INVENTION

This invention relates to spectacle frames and refers particularly, though not exclusively, to spectacle frames having components assembled using clips.

BACKGROUND OF THE INVENTION

Spectacle frames, assembled without screws or use of soldering, have been made with a front, and two temples, all being made from pressed metal and releasably secured together using a complex arrangement requiring special tools. This is inconvenient for opticians, who would find it much easier if they could insert and remove lenses from spectacle frames without requiring special tools.

SUMMARY OF THE INVENTION

In accordance with a first preferred aspect there is provided a spectacle frame comprising a front for holding therein two lenses; the front having front end pieces extending rearwardly at each end thereof, the front end pieces having an upper portion and a lower portion; the upper portion having an upper notch and the lower portion having a lower notch; a clip for attachment to the front end pieces to releasably retain the end pieces together, the clip comprising an end for engagement in the upper notch and the lower notch for retaining the upper portion and the lower portion together.

The upper notch may be in an upper edge of the upper portion and the lower notch may be in a lower edge of the upper portion. The end of the clip may comprise a bifurcated end terminating in two spaced-apart tongues for engagement in the upper notch and the lower notch.

Alternatively or additionally, one of the upper portion and the lower portion may have a geometric projection for engagement in and disengagement from a corresponding sized and shaped geometric opening in the other of the upper portion and the lower portion, the engagement and disengagement being by lateral movement only; the clip serving to retain the geometric projection in the geometric opening.

The clip may be generally S-shaped and may comprise:
(a) a lower arm operatively connected to
(b) an intermediate arm, the intermediate arm being operatively connected to
(c) a top arm; and
(d) a lip extending rearwardly and inwardly from the top arm for providing control of movement of a temple of the spectacle frame.

The upper portion may have an upper bracket extending inwardly thereof and the lower portion may have a lower bracket extending inwardly thereof.

The spectacle frame may further comprise an opening in the front end pieces.

Preferably, the upper notch is for co-operative engagement with the lower notch to form an opening; the opening being forwardly of both the geometric projection and the geometric opening; the upper bracket and the lower bracket being intermediate the opening, the geometric opening, and the geometric projection; wherein the clip comprises a tongue extending inwardly and forwardly from the lower arm for enabling the clip to engage the opening in the front end pieces.

A narrow gap may be formed between the end and the intermediate arm, the narrow gap being less than a thickness of the front end pieces. When the clip is under compression, the lip may contact the intermediate arm to form a closed loop, the clip preferably being a spring clip.

The temple may comprise:
(a) a temple end;
(b) a slot extending rearwardly from the temple end;
(c) an upper pin extending upwardly of the temple end;
(d) a lower pin extending downwardly of the temple end;
(e) the slot being able to be compressed by finger pressure to enable the upper pin and lower pin to engage in pin holes in the upper bracket and the lower bracket.

The spectacle frame may further include a temple end offset portion offset inwardly of the temple, the slot extending rearwardly beyond the temple end offset portion, the slot tapering in height from the temple end for at least the full extent of the temple end offset portion.

The clip may be integral with the temple. The slot may also extend into the top arm of the clip.

The upper bracket may have an upper skirt depending therefrom and the lower bracket has a lower skirt extending upwardly therefrom.

In a second aspect there is provided a clip for engagement with front end pieces of a spectacle frame, the clip being generally S-shaped and comprising:
(a) a lower arm operatively connected to
(b) an intermediate arm, the intermediate arm being operatively connected to
(c) a top arm;

wherein
(d) an end extends inwardly and forwardly from the lower arm for enabling the clip to engage at least one notch in the front end pieces; and
(e) a lip extends rearwardly and inwardly from the top arm for providing control of movement of a temple of the spectacle frame.

A narrow gap may be formed between the end and the intermediate arm, the narrow gap preferably being less than a thickness of the front end pieces. The lip may contact the intermediate arm to form a closed loop when temple is in closed position and under pressure. The clip may be a spring clip. The temple may be integral with the clip. A slot may extend from the top arm of the clip into the temple.

The end may be bifurcated remote from the intermediate arm and may terminate in two L-shaped and spaced apart tongues.

In a third aspect there is provided a temple for engagement with front end pieces of a spectacle frame, the temple comprising:
(a) a temple end;
(b) a slot extending rearwardly from the temple end;
(c) an upper pin extending upwardly of the temple end;
(d) a lower pin extending downwardly of the temple end;
(e) the slot being able to be compressed by finger pressure to enable the upper pin and lower pin to engage in pin holes of the front end pieces.

The temple may further include a temple end offset portion offset inwardly of the temple. The slot may extend rearwardly beyond the front offset portion, and may taper in height from the temple end. The slot may extend for at least the full extent of the temple end offset portion. The clip may be integral with the temple. The slot may also extend into the top arm of the clip. The upper bracket may have an upper skirt depending therefrom and the lower bracket may have a lower skirt extending upwardly therefrom. The temple may further comprise an integral clip.

The clip may be generally S-shaped and may comprise:

(a) a lower arm operatively connected to (b) an intermediate arm, the intermediate arm being operatively connected to a top arm;

wherein (c) an end extends inwardly and forwardly from the lower arm for enabling the clip to engage at least one notch in the front end pieces; and (d) a lip extends rearwardly and inwardly from the top arm for providing control of movement of a temple of the spectacle frame.

A narrow gap may formed between the end and the intermediate arm, the narrow gap being less than a thickness of the front end pieces. When the clip is under compression, the lip may contact the intermediate arm to form a closed loop. The clip may be a spring clip. The slot may extend from the top arm of the clip into the temple.

The temple may further comprise a rear end with an elongate slot therein with a split end, the rear end being adapted to engage longitudinal grooves of a temple tip. The longitudinal grooves may end with wells for the split end.

In a final aspect, there is provided a method for inserting a lens into a rim of a spectacle frame, the method comprising:

(a) opening the rim;

(b) inserting the lens in the rim;

(c) closing the rim;

(d) moving an upper portion of a front end piece of the rim to be adjacent and aligned with a lower portion of the front end piece;

(e) using finger pressure to insert two spaced apart tongues of a clip into spaced apart notches in the upper portion and the lower portion; and (f) using finger pressure to force the clip over and into engagement with the front end pieces to hold the front end pieces together.

The retainer may be a clip. The clip may be as described above.

BRIEF DESCRIPTION OF THE DRAWINGS

In order that the invention may be readily understood and put into practical effect, there shall now be described by way of non-limitative example only preferred embodiments of the present invention, the description being with reference to the accompanying illustrative drawings in which.

DETAILED DESCRIPTION OF PREFERRED EMBODIMENT

Figure 1:
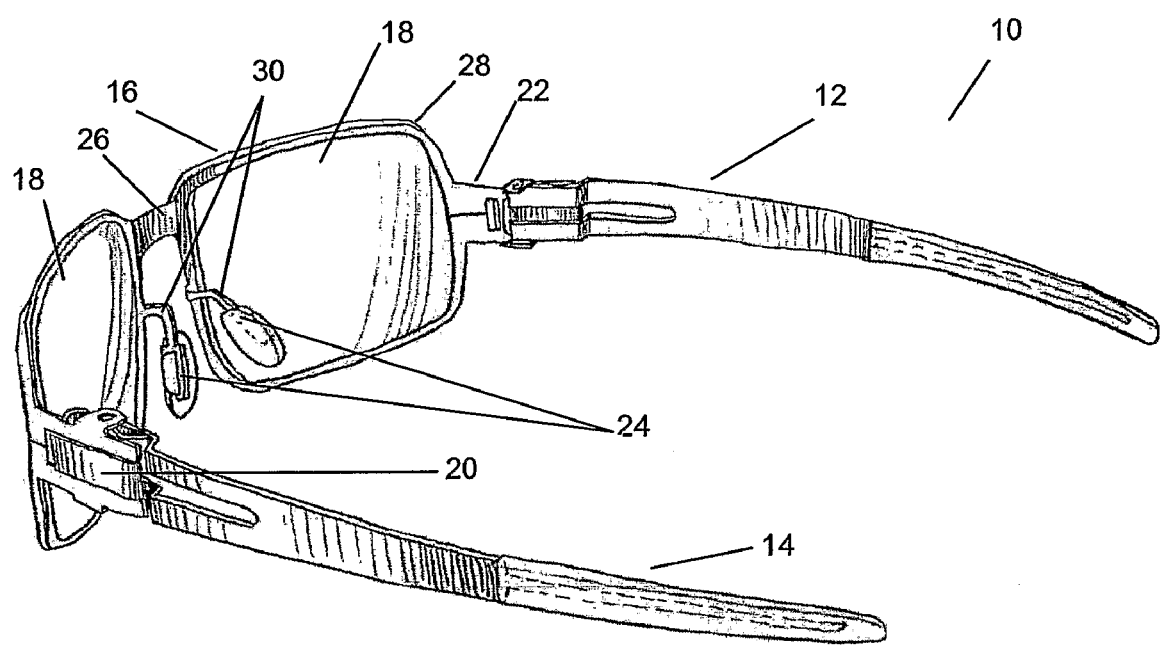
FIG. 1 is a rear perspective view of one embodiment of a spectacle frame when assembled.

Throughout the description, like components have like reference numerals.

FIG. 1 shows a spectacle frame generally designated as 10 comprising a right temple 12, a left temple 14, a front 16, lenses 18, nose pads 24, and clips 20 at front end pieces 22 to releasably secure the frame 10.

The nose pads 24 are mounted on arms 30 in a known manner. Arms 30 are preferably integrally formed with front 16.

The front 16 also includes a bridge 26 and rims 28. Rims 28 may be complete, as shown, partial (top or bottom), or front 16 may be rimless. If rimless, bridge 26 arms 30 and front end pieces 22 may be securely yet releasably attached to lenses 18 in a known manner.

Figure 2:
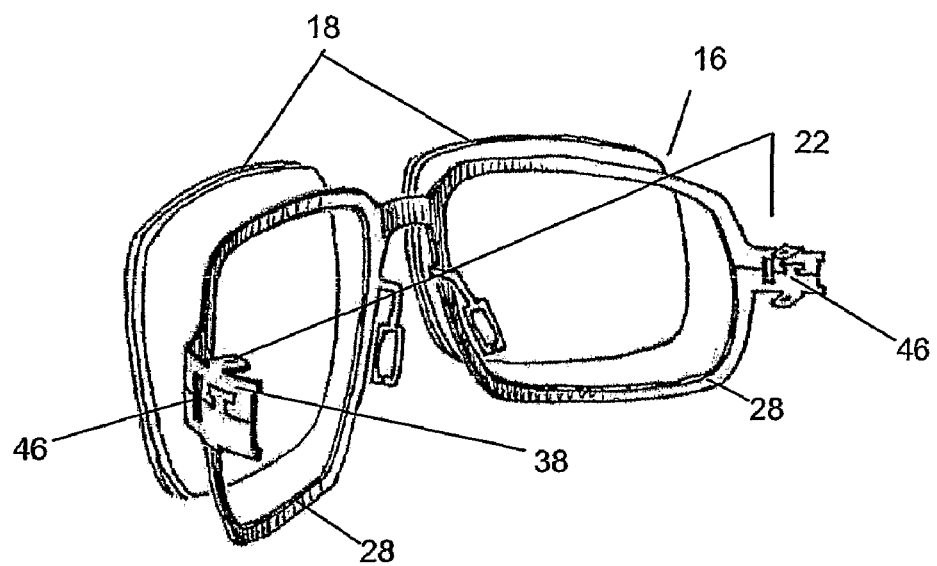
FIG. 2 is a rear perspective view of the front of the embodiment of FIG. 1.
Figure 3:
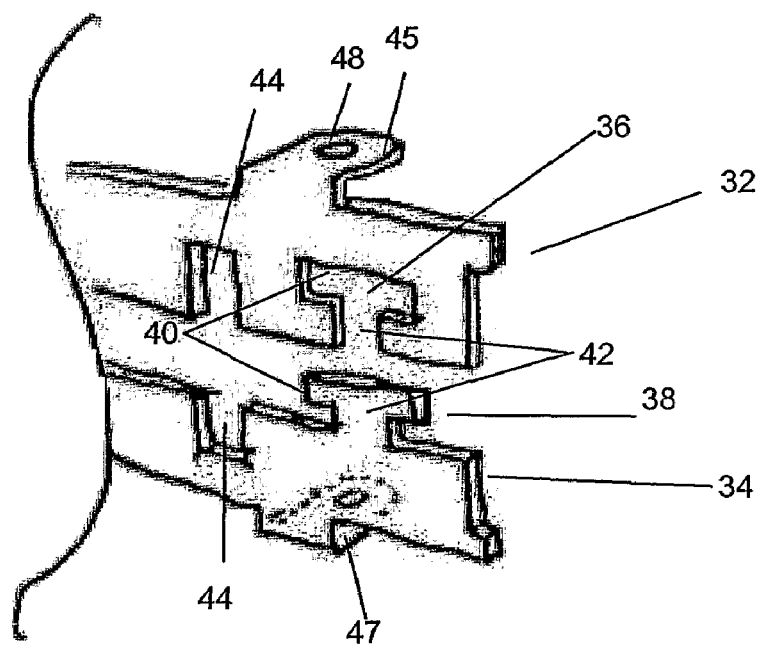
FIG. 3 is an enlarged view of the end pieces of one side of the front of FIG. 2.

To be able to insert and remove lenses 18 from rims 28, rims 28 need to be able to be opened and closed, preferably without the need for special tools. More preferably, it should be able to be done using only hand and/or finger pressure. This is shown in FIGS. 2 and 3.

Each of the front end pieces 22 are formed or manufactured as an upper end piece 32 and a lower end piece 34, the upper end piece 32 and lower end piece 34 being able to be selectively moved to open rims 28, or to close rims 28. This is by upper end piece 32 having a geometric opening 36 and lower end piece 34 having a correspondingly-shaped and sized geometric projection 38 able to be releasably received in the opening 36. The geometric shape of opening 36 and projection 38 is such that relative movement therebetween is only possible laterally and is not possible in the planes of the end pieces 32, 34.

In this way projection 38 in placed adjacent opening 36 and either or both upper end piece 32 and lower end piece 34 are moved laterally to have projection 38 occupy opening 36.

The geometric shape of opening 36 and projection 38 may be any suitable shape such as, for example, T (as shown), F, Y, inverted L, inverted J, Z, O, and so forth. For opening 36, and thus projection 38, there is an upper portion 40 and a lower portion 42. The upper portion 40 should be of greater width than the lower connecting portion 42 to prevent relative movement in the plane of the end pieces 22.

Each of the upper end piece 32 and lower end piece 34 has an aligned notch 44 therein such that, when the end pieces 32, 34 are assembled, notches 44 combine to form an opening 46. Preferably, opening 46 is rectangular, as shown. Notches 44 are located forwardly of but adjacent to opening 36 and projection 38.

As an alternative, lower end piece 34 may have opening 36 and upper end piece 32 may have projection 38.

Extending inwardly from upper edge of upper end piece 32 and lower edge of lower end piece 34 are upper brackets 45 and 47 respectively. Brackets 45, 47 are located between opening 36 and notch 44, and projection 38 and notch 44, respectively. Each bracket 44, 46 has a pin hole 48 therein.

Figure 4:
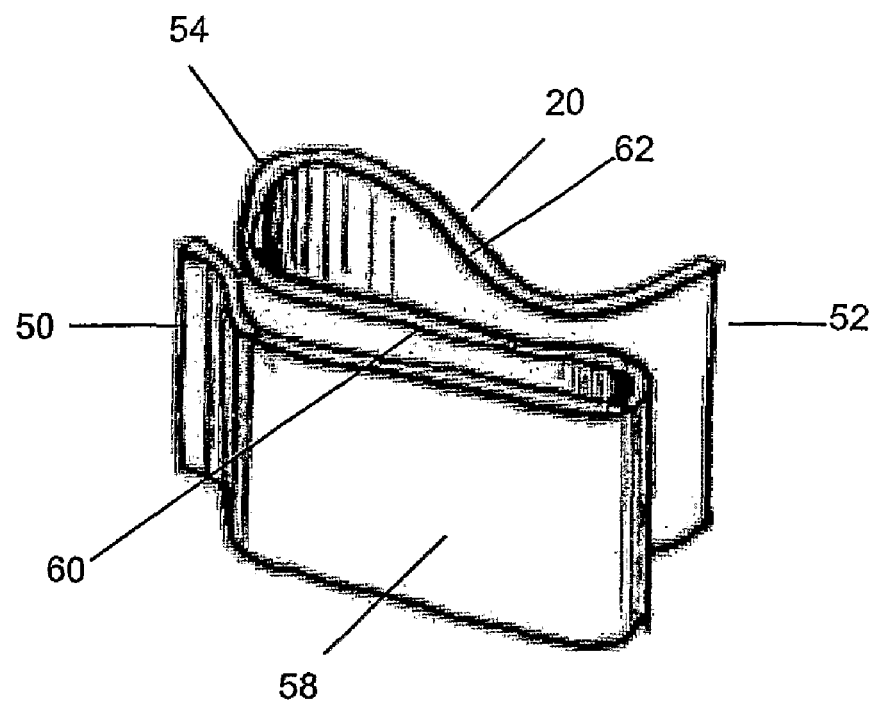
FIG. 4 is a top perspective view of one clip as used with the embodiment of FIG. 1.
Figure 5:
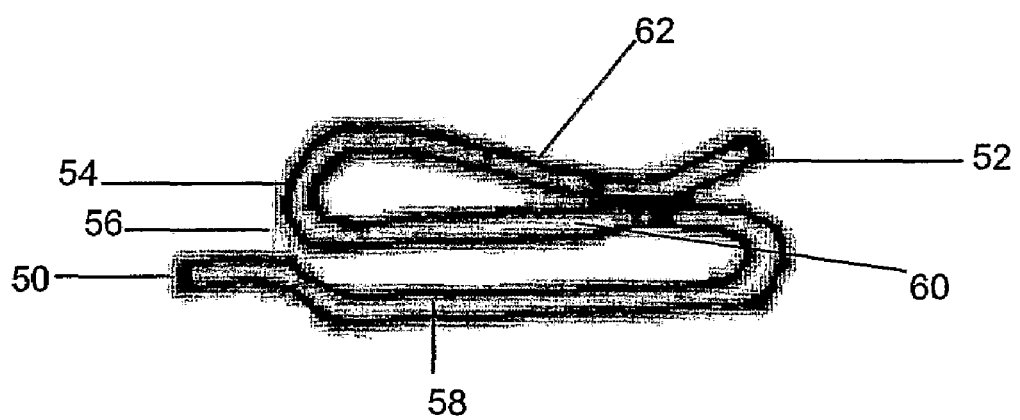
FIG. 5 is a top view of the clip of FIG. 4.

The clips 20 required to hold the assembly are shown in FIGS. 4 and 5. Each clip 20 is generally S-shaped with a tongue 50 at one end, and an upturned lip 52 at the other end. The tongue 50 extends forwardly and inwardly, and lip 52 extends rearwardly and inwardly. As is clear from FIG. 5, when the clip 20 is under a compressive force, the upturned lip 52 contacts the remainder of the clip 20 to form a closed loop 54. The tongue 50 forms a narrow gap 56 with the remainder of the clip 20. Preferably, the narrow gap 56 is preferably less than the thickness of the front end pieces 22 so that it will fit securely around front end pieces 22. The clips 20 are spring clips preferably of a high tensile-strength stainless-steel.

Figure 6:
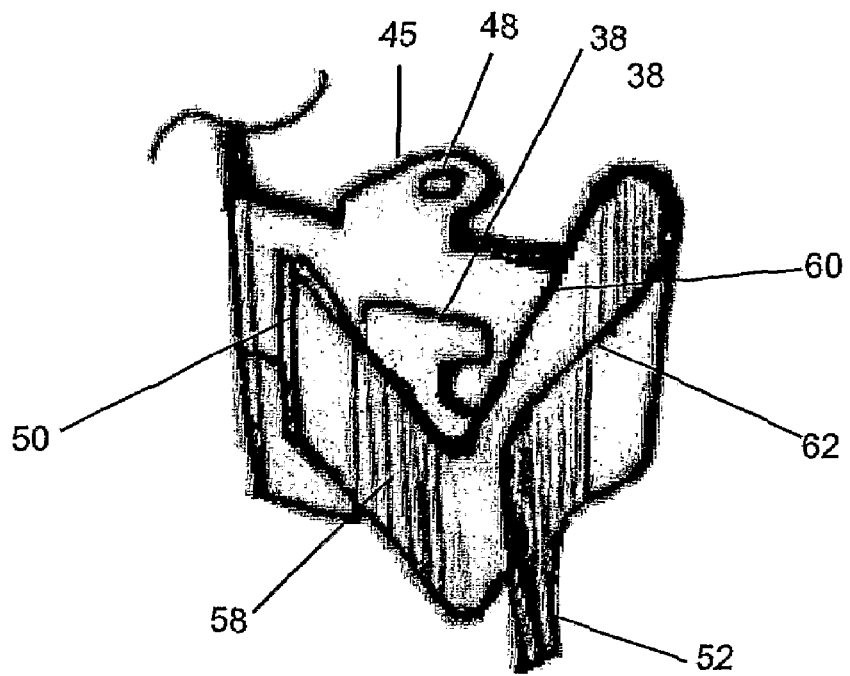
FIG. 6 is a top perspective view showing the first stage of assembling the clip of FIGS. 4 and 5 with the end pieces of FIG. 3.
Figure 7:
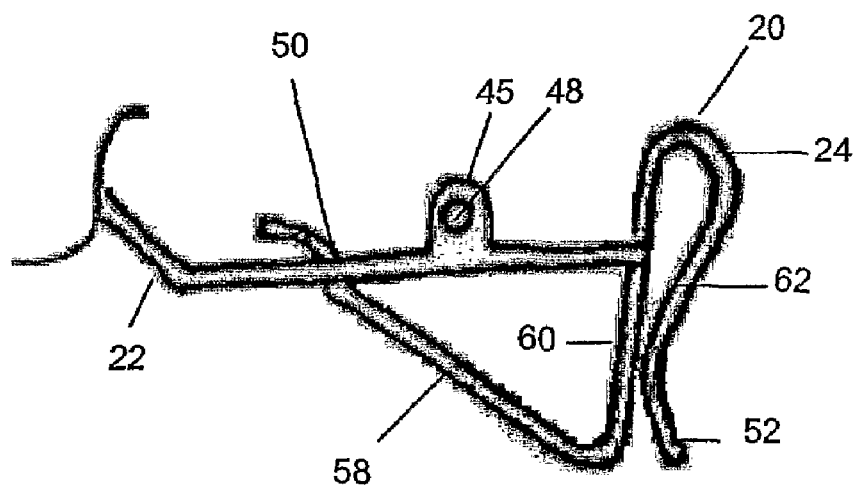
FIG. 7 is a top view corresponding to FIG. 6.
Figure 8:
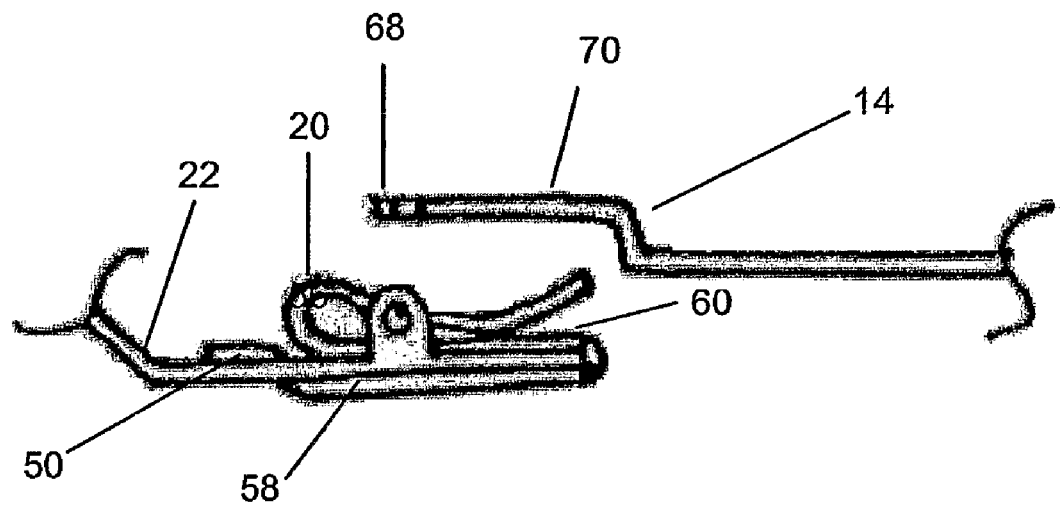
FIG. 8 is a top view of the assembled clip and end pieces, prior to attachment of the temple.
Figure 9:
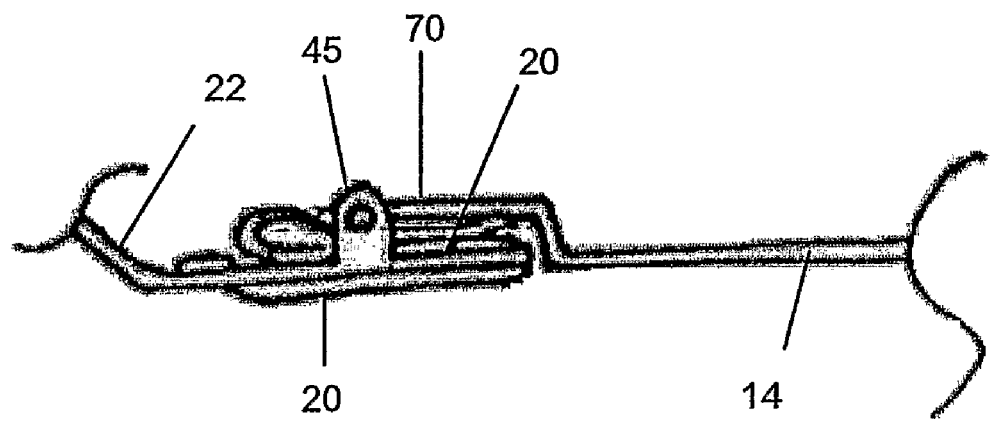
FIG. 9 is a view corresponding to FIG. 8 at the completion of the attachment of the temple.
Figure 10:
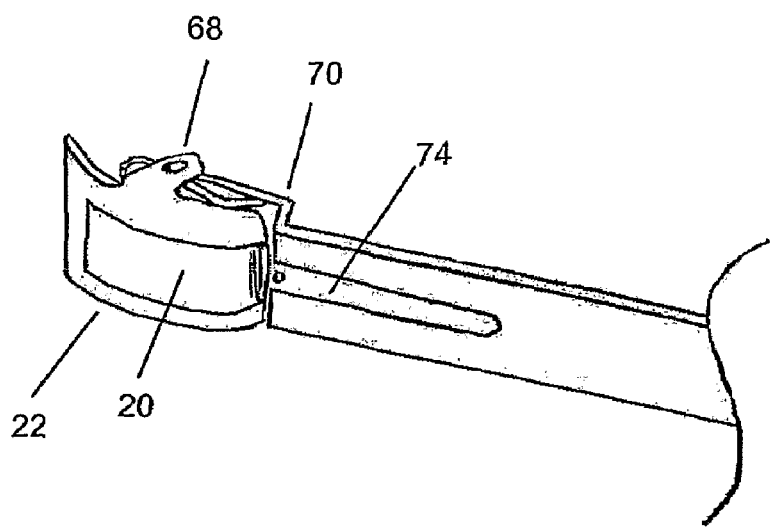
FIG. 10 is a perspective view corresponding to FIG. 9.
Figure 11:
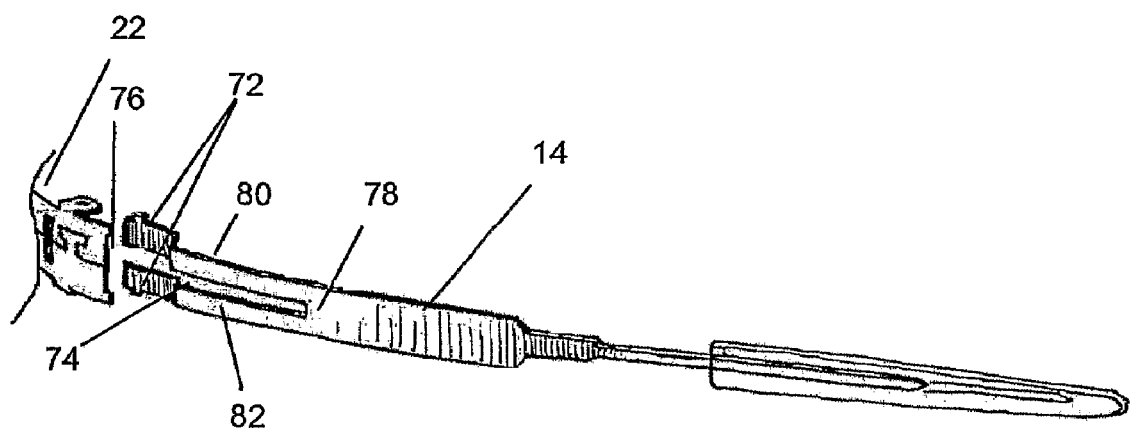
FIG. 11 is a perspective view corresponding to FIG. 8, with the clip removed.
Figure 12:
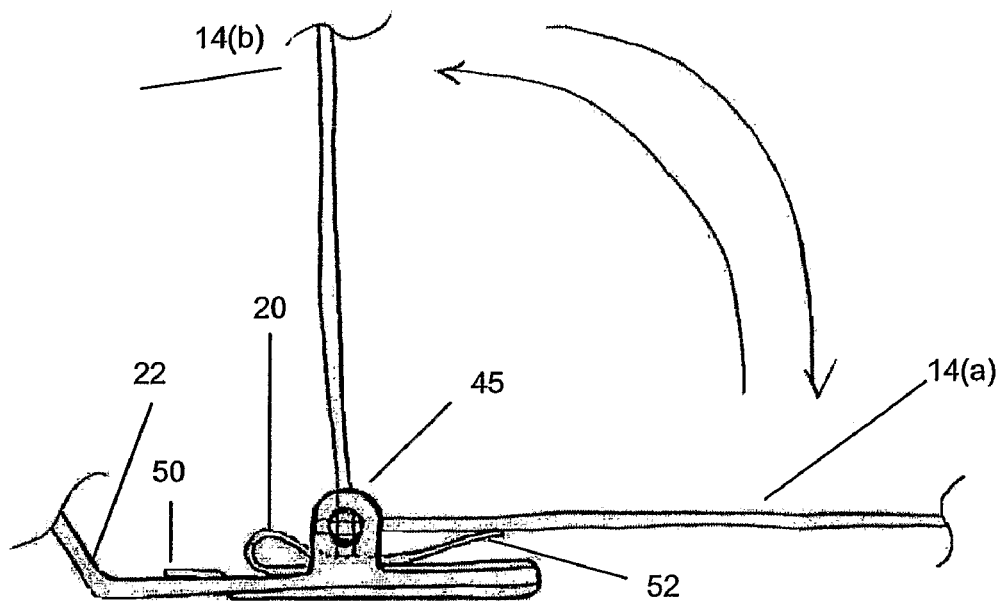
FIG. 12 is a top view corresponding to FIG. 9 showing the temple in the open and closed position.
Figure 13:
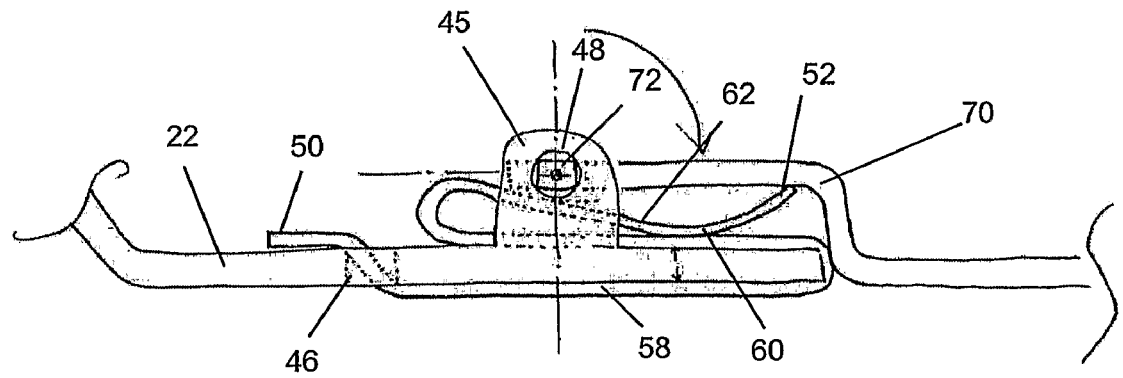
FIG. 13 is an enlarged top view of the hinge showing the temple in the open position.
Figure 14:
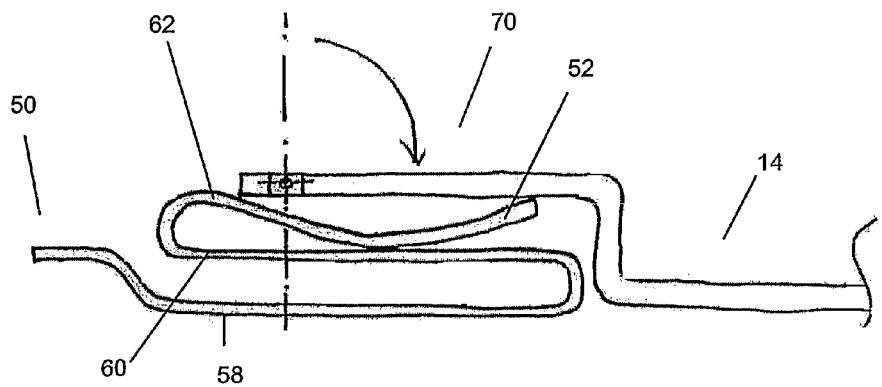
FIG. 14 is a partial top view corresponding to FIG. 13.
Figure 15:
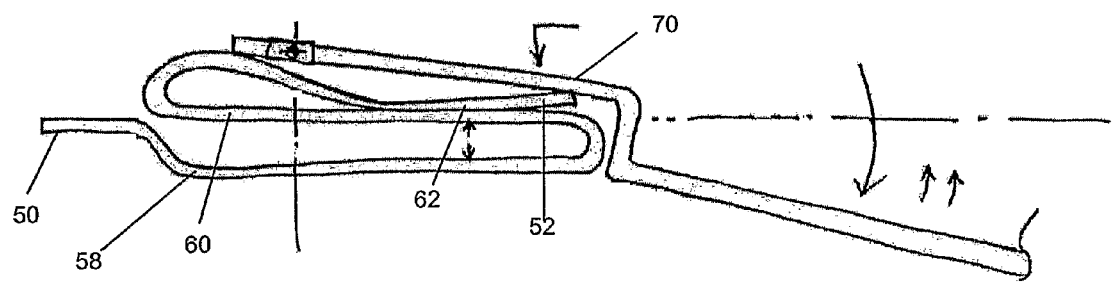
FIG. 15 is a partial top view corresponding to FIG. 14 when an excessive open force is applied to a temple when it is already in the open position.

The assembly of the clips 20 with front end pieces 22 is shown in FIGS. 6 to 8. After inserting the lenses 18 in rims 28, the end pieces 22 are assembled as shown in FIGS. 2 and 3, and as described above. Tongue 50 is then placed in opening 46 and narrow gap 56 enlarged by forcing the clips 20 over end pieces 22 by finger pressure. The clip 20 is then moved such that its lower arm 58 is pressing on the outer side of end pieces 22, and intermediate arm 60 is pressing on the inner side of end pieces 22. As narrow gap 56 is less than the thickness of end pieces 22, the arms 58, 60 exert a force on both sides of end pieces 22 between opening 46 and edge of end pieces 32, 34. As arms 58, 60 are generally flat, and as the clips 20 extend from opening 46 over the ends of end pieces 22, the forces are exerted on projection 38 to maintain projection 38 in opening 36. By virtue of the geometric shape of projection 38 and opening 36, the projection 38 cannot be accidentally disengaged from opening 36 due to the applied lateral forces of clip 20.

To remove lenses 18, all that is required is to reverse the above procedure—remove clips 20 by finger pressure, remove projection 38 from opening 36 by lateral movements, open rims 28, and remove lenses 18.

The temples 12, 14 are mirror images of each other. Their construction, and assembly/disassembly, are the same. This is shown in FIGS. 8 to 11. The temples 12, 14 are assembled with front 16 after clips 20 have been placed on end pieces 22.

Each temple 12, 14 has a rear end 64 with a cover 66 in accordance with known techniques, designs, and materials for cover 66. The temples 12,14 each have a front, temple end 68 that has an inwardly-offset temple end 70 with upwardly and downwardly directed pins 72 sized and shaped to fit into pin holes 48 in brackets 45, 47. The extent of the offset of offset temple end 70 is approximately the same as the thickness of clip 20 when assembled on end pieces 22 (see FIG. 9).

An elongate slot 74 in and through each temple 12,14 extends rearwardly from temple end 68 for the entire extent of offset temple end 70, and preferably rearwardly beyond offset temple end 70. Preferably, the slot 74 tapers in height from its front 76 to its rear 78. In this way the offset temple end 70 has an upper portion 80 and a lower portion 82. By use of finger pressure, portions 80, 82 can be forced closer together thus reducing the height of slot 74 at its front 76. This enables pins 72 to be engaged in pin holes 48 in upper end lower brackets 45, 47. By having temples 12,14 of a resilient material such as, for example, high tensile-strength stainless steel, release of the finger pressure of upper and lower portions 80, 82 allows slot 74 to resume its normal height and pins 72 to fully engage in pin holes 48. Removal is the reverse procedure. Temples 12,14 can therefore pivot about pins 72, with pins 72 and pin holes 48 acting as a hinge.

The shape and resiliency of top arm 62 of clips 20 provides an appropriate cam, or over centre, action for each temple 12,14. This is shown in FIGS. 12 to 15. When the temple 14 is in the open position, it contacts lip 52 to thus provide a limit of the arcuate movement of temple 14. The resilient nature of clip 20, and thus top arm 62 and lip 52, allows for excessive movement/force (FIG. 15) but in, the end, lip 52 is laid substantially flat against intermediate arm 60 and thus further movement of temple 14 is impossible without risking damage. When temple 12,14 is in open position, temple end 68 does not contact clip 20.

When each temple 12,14 is moved to the closed position, temple end 68 moves from no contact with clip 20, to contacting top arm 62 of clip 20. This provides a resistance to movement of the temple 12,14. Due to the sloping nature of top arm 62, the resistance is strongest at the start of the movement. The initial contact of temple end 68 with top arm 62 compresses top arm 62. As the temple continues its movement, compression continues and lip 52 contacts intermediate arm 60. This requires about 25 degrees of movement by temple 12,14. As such during that part of the movement, there is a strong tendency for the temple 12,14 to return to the fully open position if the movement force is removed. This is due to the resiliency of the spring clip 20 acting on temple end 68. Between that position (25 degrees of movement), and almost closed, there will still be a tendency for each temple 12,14 to return to the open position if the movement force is removed, but the natural resistance to movement due to friction may be sufficient to overcome to biasing effect of the clip 20.

Due to the sloping nature of top arm 62, the resistance to movement decreases as the temple 12,14 approaches the fully closed position. The maximum compressive force applied to the top arm 62 by temple end 68 is when the temple end offset portion 70 is perpendicular to the front end pieces 22. This is slightly before the fully closed position. Therefore, in moving to the closed position there is a reduction in force for the final part of the movement. This provides an over-centre, or cam, effect such that the temples 12,14 are biased to the fully open, and fully closed positions.

Thus, each temple 12, 14 has two "rest" position—fully open, and fully closed. Any position other than these two will be metastable such that the temples 12, 14 are biased to those two positions and will move to one of the two positions on application of a small force to overcome any resistance to movement due to friction.

As each lip 52 contacts temples 12, 14 when temples 12, 14 are in the open position, temples are held in that position securely by means of tension.

The clips 20 may be integrated with temples 14, 16. This is shown in FIGS. 16 to 19, where like reference numerals are used for like components but with a prefix number 2.

Figure 16:
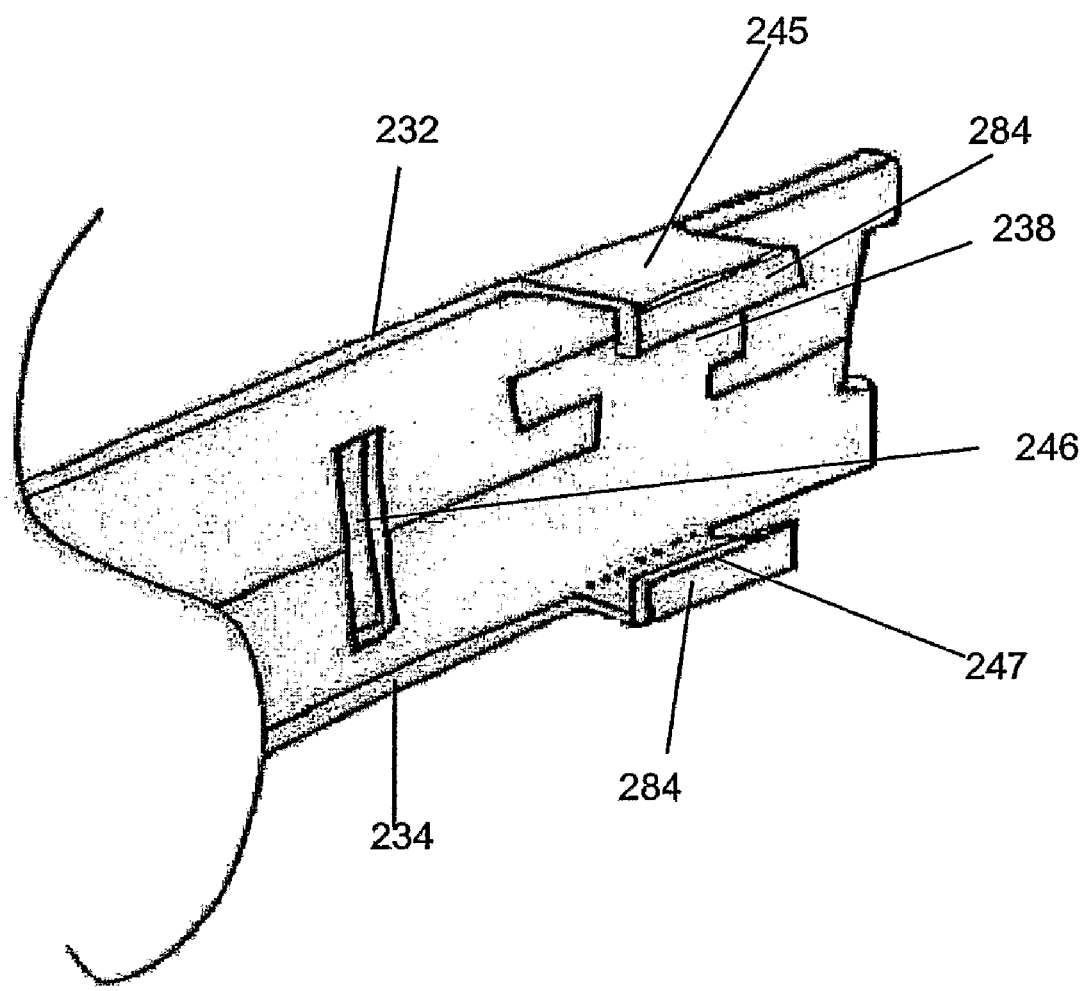
FIG. 16 is a partial perspective view of front end pieces according to a second embodiment.

As can be seen from FIG. 16, upper end piece 232 and lower end piece 234 are substantially the same as the first embodiment. Projection 238 (and its corresponding opening) are the same, as is slot 246. Upper brackets 245 and 247 are different in that there are no pin holes, and each bracket 245, 247 has a skirt 284—the skirt 284 of upper bracket 245 extending downwardly, and the skirt 284 of lower bracket extending upwardly.

Figure 17:
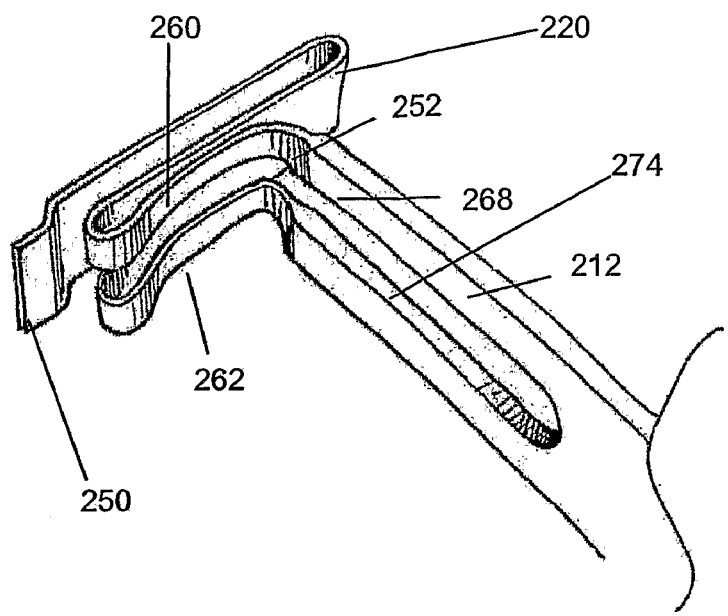
FIG. 17 is a partial perspective view of a second embodiment of temple.
Figure 18:
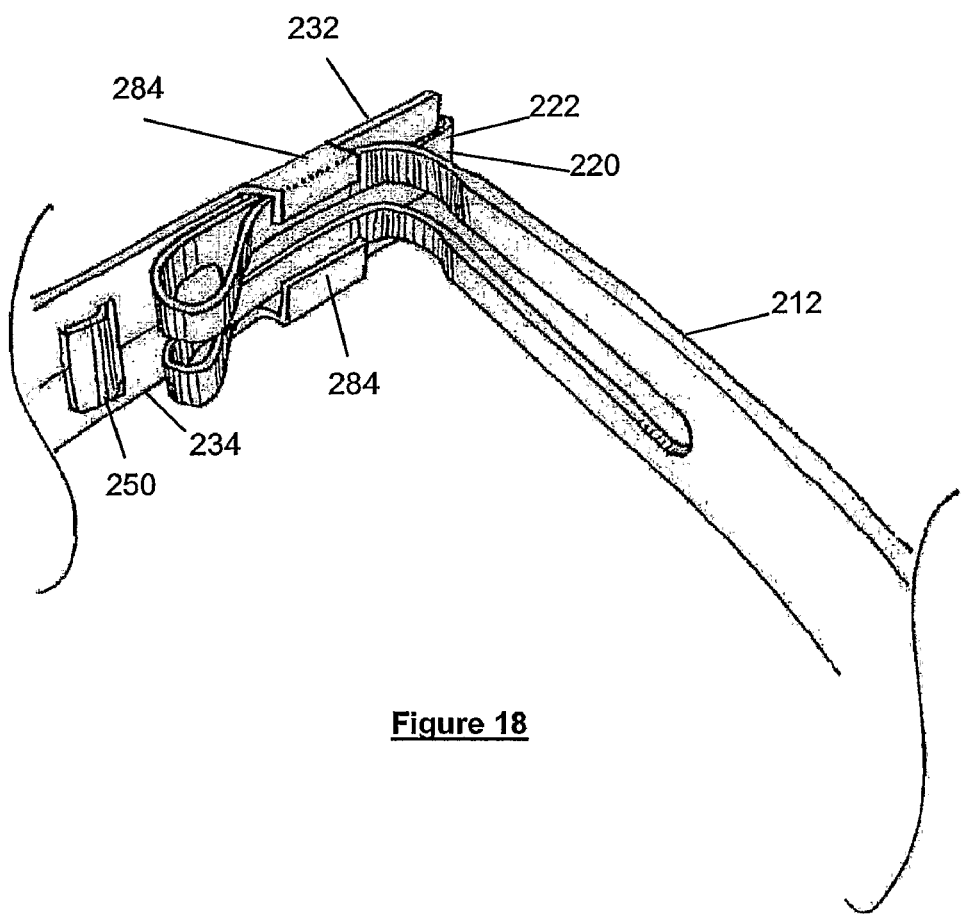
FIG. 18 is a partial perspective view of the temple of FIG. 17 fitted to the front end pieces of FIG. 16.
Figure 19:
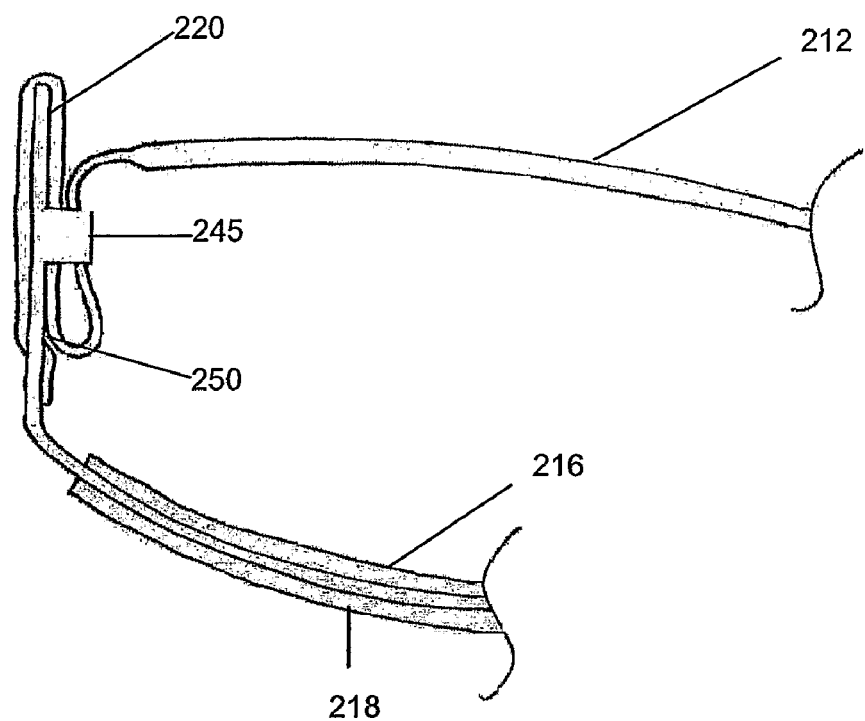
FIG. 19 is a top view corresponding to FIG. 18.

FIG. 17 shows temple 212 with an integrated clip 220. The clip 220 is as before, with tongue 250 and top arm 262, but lip 252 curves inwardly to a greater extent to merge into temple end 268 of temple 16. Slot 274 of temple 216 may extend into clip 220, at least through top arm 262 and into, but not all the way along, intermediate arm 260. The slot 274 is for the same purpose—compression—to allow temple 212 with integrated clip 220 to be compressed to fit between brackets 245 and 247 after passing between skirts 284.

To assemble temple 212 with upper and lower front end pieces 232, 234 is similar to the first embodiment in that tongue 250 engages slot 246, and the clip 220 is forced over front end piece 222. The difference is that intermediate arm 260 and top arm 262 are captured behind skirts 284 of top bracket 245 and lower bracket 247, and between top bracket 245 and lower bracket 247. By clip 220 being of a resilient material such as, for example, spring stainless steel, temple 212 can be pivoted about brackets 245, 247 in a normal manner.

Figure 20:
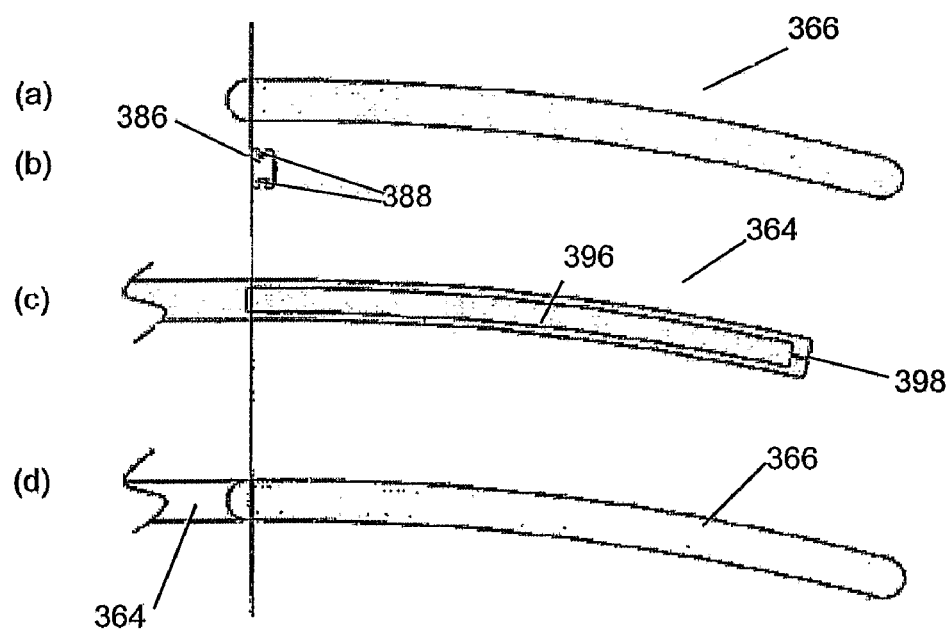
FIG. 20 is a partial side view of a third embodiment of a temple.

FIG. 20 illustrates a third embodiment of the temple. Again, like reference numerals are used for like components with the addition of a prefix number "3". In the drawing:
(a) is the temple tip;
(b) is the cross-section of (a);
(c) is the temple end; and
(d) is the assembly of the temple tip on the temple end.

Illustrated are the rear ends 364 of temples 312, 314. Each rear end 364 has a temple cover or tip 366. The temple lip 366 has a solid core 386 with elongate upper and lower slots 388 from its front end 390 to its rear end 392. At the rear end 392, the slots 388 have extended depth at wells 394. Each rear end 364 of the temples has an elongate slot 396 therethrough terminating in a split end 398. In this way slot 396 can be opened, until split end 398 opens; split end 398 engaged in slots 388, and temple tip 366 pushed over rear end 364 until the split end 398 engages in wells 394. This will be in the manner of a snap fit, so there is a clear indication to a user when tip 366 is correctly engaged on rear end 364. Therefore, rear end 364 of temples engage over tip 366, rather that the tip 366 engaging over rear end 364, as is normal. Also, part of rear end 364 may be visible to give an attractive appearance.

By core 386 being of a greater width than rear end 364, the tip 366 provides adequate protection and cushioning to a user.

Figure 21:
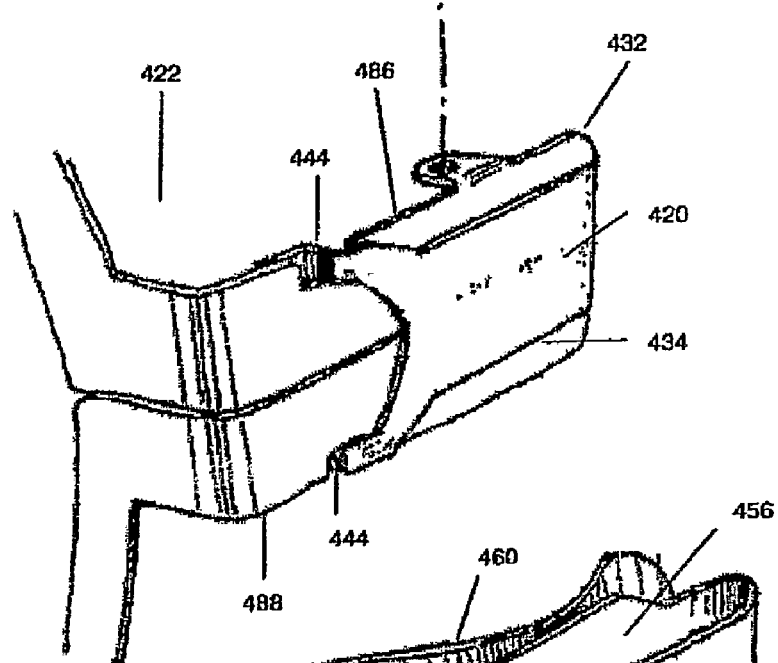
FIG. 21 is a partial front perspective view of a fourth embodiment.
Figure 22:
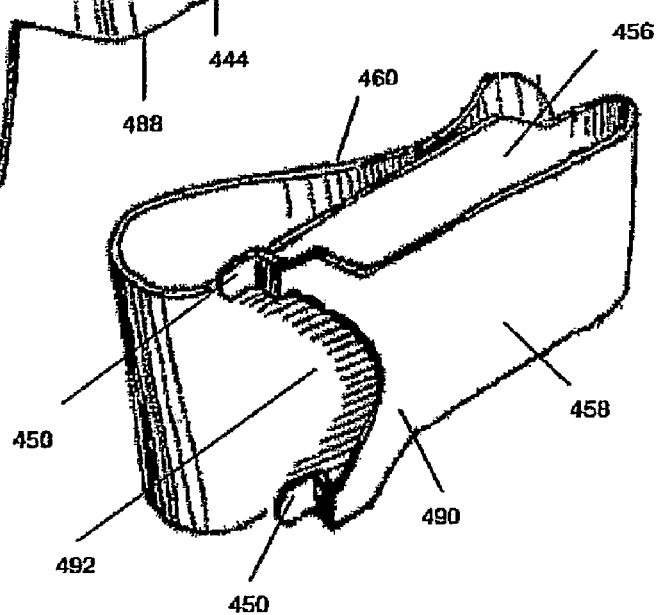
FIG. 22 is a front perspective view of the clip of FIG. 21.
Figure 23:
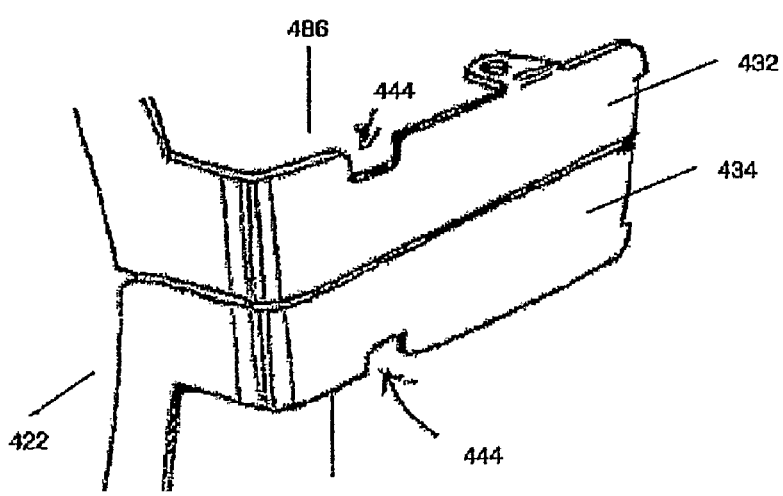
FIG. 23 is a partial perspective view of the frame of FIG. 21.

FIGS. 21 to 23 illustrate a fourth embodiment where upper end piece 432 has no opening 36 or projection 38, and notch 444 is located at upper edge 486; and lower end piece 434 has no opening 36 or projection 38, and notch 444 is located at lower edge 488.

Clip 420 is very much as before except that tongue 450 and lower arm 458 are changed. Lower arm 458 is bifurcated at its outer end 490 and terminates in two L-shaped tongues 450. The tongues 450 are separated by an arcuate recess 492.

Therefore, to assemble clips 420 with front end pieces 422, the tongues 450 are placed in notches 444 and narrow gap 456 enlarged by forcing the clips 420 over end pieces 422 by finger pressure. The clip 420 is then moved such that its lower arm 458 is pressing on the outer side of end pieces 422, and intermediate arm 460 is pressing on the inner side of end pieces 422. As narrow gap 456 is less than the thickness of end pieces 422 the arms 458, 460 exert a force on both sides of end pieces 422 between notches 444 and the ends of end pieces 432, 434. Due to this force, and that tongues 450 in notches 444 hold the end pieces 432, 434 together, the forces are exerted on end pieces 432, 434 to maintain end pieces 432, 434 together and aligned, as is shown in the drawings. By virtue of the fixed distance between tongues 450, and the inherent strength of clips 420, accidental separation of end pieces 432, 434 is unlikely. The distance between the tongues 450 should by the same as, or only fractionally greater than, the distances between notches 444 so that when engaged in notches 444 the tongues 450 will hold end pieces 432, 434 together.

By virtue of the shape of the tongues 450 they will also assist in retaining the end pieces 432, 434 together laterally as well as vertically. Although the notches 444 are shown in the top edge 486 and lower edge 488, they may be adjacent but not extending into those edges.

Whilst there has been described in the foregoing description preferred embodiments of the present invention, it will be understood by those skilled in the technology that may variations or modifications in details of design, construction or operation may be made without departing from the present invention.

The invention claimed is:

1. A spectacle frame comprising: (a) a front for holding therein two lenses; (b) the front having front end pieces extending rearward at each end thereof, the front end pieces having an upper portion and a lower portion; (c) the upper portion having an upper notch and the lower portion having a lower notch; (d) a clip for attachment to the front end pieces to releasably retain the end pieces together, the clip comprising an end for engagement in the upper notch and the lower notch for retaining the upper portion and the lower portion together, the clip being generally S-shaped and includes: (a) a lower arm operatively connected to (b) an intermediate arm; the intermediate arm being operatively connected to (c) a top arm; and (d) a lip extending rearward and inwardly from the top arm for providing control of movement of a temple of the spectacle frame.

2. A spectacle frame as claimed in claim 1, wherein the upper notch is in lower edge of the upper portion, the lower notch is in an upper edge of the lower portion; and the end of the clip comprises a bifurcated end terminating in two spaced-apart tongues for engagement in the upper notch and the lower notch.

3. A spectacle frame as claimed in claim 2, wherein the upper portion has an upper bracket extending inwardly thereof and the lower portion has a lower bracket extending inwardly thereof.

4. A spectacle frame as claimed in claim 3, wherein upper notch is for co-operative engagement with the lower notch to form an opening; the opening being forwardly of both the geometric projection and the geometric opening; the upper bracket and the lower bracket being intermediate the opening, the geometric opening, and the geometric projection; wherein the clip comprises a tongue extending inwardly and forwardly from the lower arm for enabling the clip to engage the opening in the front end pieces.

5. A spectacle frame as claimed in claim 3, wherein the temple comprises: (a) a temple end; (b) a slot extending rearward from the temple end; (c) an upper pin extending upwardly of the temple end; (d) a lower pin extending downwardly of the temple end; (e) the slot being able to be compressed by finger pressure to enable the upper pin and lower pin to engage in pin holes in the upper bracket and the lower bracket.

6. A spectacle frame as claimed in claim 5, further including a temple end offset portion offset inwardly of the temple, the slot extending rearward beyond the temple end offset portion, the slot tapering in height from the temple end for at least the full extent of the temple end offset portion.

7. A spectacle frame as claimed in claims 5 or 6, wherein the clip is integral with the temple.

8. A spectacle frame as claimed in claim 5, wherein the slot also extends into the top arm of the clip and the clip is integral with the temple.

9. A spectacle frame as claimed in claims 3, 4, 5, 6 or 8, wherein the upper bracket has an upper skirt depending therefrom and the lower bracket has a lower skirt extending upwardly therefrom.

10. A spectacle frame as claimed in claim 1, wherein a narrow gap is formed between the end and the intermediate arm, the narrow gap being less than a thickness of the front end pieces.

11. A spectacle frame as claimed in claim 1, wherein when the clip is under compression, the lip contacts the intermediate arm to form a closed loop, the clip being a spring clip.

12. A spectacle frame comprising: (a) a front for holding therein two lenses; (b) the front having front end pieces extending rearward at each end thereof, the front end pieces having an upper portion and a lower portion; (c) the upper portion having an upper notch and the lower portion having a lower notch; (d) a clip for attachment to the front end pieces to releasably retain the end pieces together, the clip comprising an end for engagement in the upper notch and the lower notch for retaining the upper portion and the lower portion together, one of the upper portion and the lower portion having a geometric projection for engagement in and disengagement from a corresponding sized and shaped geometric opening in the other of the upper portion and the lower portion, the engagement and disengagement being by lateral movement only; the clip serving to retain the geometric projection in the geometric opening.

13. A spectacle frame as claimed in any one of claims 1 to 12, further comprising an opening in the front end pieces.

14. A clip for engagement with front end pieces of a spectacle frame, the clip being generally S-shaped and comprising: (a) a lower arm operatively connected to (b) an intermediate arm, the intermediate arm being operatively connected to (c) a top arm; wherein (d) an end extends inwardly and forwardly from the lower arm for enabling the clip to engage at least one notch in the front end pieces; and (e) a lip extends rearward and inwardly from the top arm for providing control of movement of a temple of the spectacle frame.

15. A clip as claimed in claim 14, wherein a narrow gap is formed between the end and the intermediate arm, the narrow gap being less than a thickness of the front end pieces, and when the clip is under compression, the lip contacts the intermediate arm to form a closed loop.

16. A clip as claimed in claim 14 or claim 15, wherein the end is bifurcated remote from the intermediate arm and terminates in two L-shaped and spaced apart tongues.

17. A clip as claimed in claim 16, wherein the clip is a spring clip.

18. A clip as claimed in claim 17, wherein the temple is integral with the clip.

19. A clip as claimed in claim 18, wherein a slot extends from the top arm of the clip into the temple.

20. A temple for engagement with front end pieces of a spectacle frame, the temple comprising: (a) a temple end; (b) a slot extending rearward from the temple end; (c) an upper pin extending upwardly of the temple end; (d) a lower pin extending downwardly of the temple end; (e) the slot being able to be compressed by finger pressure to enable the upper pin and lower pin to engage in pin holes of the front end pieces; and (f) an integral clip, the clip being generally S-shaped and includes: (a) a lower arm operatively connected to (b) an intermediate arm, the intermediate arm being operatively connected to (c) a top arm; wherein (d) an end extends inwardly and forwardly from the lower arm for enabling the clip to engage at least one notch in the front end pieces; and (e) a lip extends rearward and inwardly from the top arm for providing control of movement of a temple of the spectacle frame, the temple further comprising a rear end with an elongate slot therein with a split end, the rear end being adapted to engage longitudinal grooves of a temple tip.

21. A temple as claimed in claim 20, further including a temple end offset portion offset inwardly of the temple, the slot extending rearward beyond the front offset portion, and the slot tapering from the temple end.

22. A temple as claimed in claim 20, wherein a narrow gap is formed between the end and the intermediate arm, the narrow gap being less than a thickness of the front end pieces.

23. A temple as claimed in claim 22, wherein when the clip is under compression, the lip contacts the intermediate arm to form a closed loop.

24. A temple as claimed in claim 22, or 23, wherein the clip is a spring clip.

25. A temple as claimed in claim 24, wherein the slot extends from the top arm of the clip into the temple.

26. A temple as claimed in claim 25, the temple further comprising a rear end with an elongate slot therein with a split end, the rear end being adapted to engage longitudinal grooves of a temple tip.

27. A temple as claimed in claim 26, wherein the longitudinal grooves end with wells for the split end.

* * * * *